(12) United States Patent
Cho et al.

(10) Patent No.: US 10,770,734 B2
(45) Date of Patent: Sep. 8, 2020

(54) LITHIUM AIR BATTERY AND MANUFACTURING METHOD THEREFOR

(71) Applicant: LG CHEM, LTD., Seoul (KR)

(72) Inventors: Eunkyung Cho, Daejeon (KR); Kwonnam Sohn, Daejeon (KR); Jonghyun Chae, Daejeon (KR); Doo Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 142 days.

(21) Appl. No.: 15/559,919

(22) PCT Filed: Aug. 12, 2016

(86) PCT No.: PCT/KR2016/008937
§ 371 (c)(1),
(2) Date: Sep. 20, 2017

(87) PCT Pub. No.: WO2017/030332
PCT Pub. Date: Feb. 23, 2017

(65) Prior Publication Data
US 2018/0076466 A1   Mar. 15, 2018

(30) Foreign Application Priority Data

Aug. 14, 2015  (KR) .................. 10-2015-0115017
Aug. 12, 2016  (KR) .................. 10-2016-0103096

(51) Int. Cl.
*H01M 4/00* (2006.01)
*H01M 4/96* (2006.01)
(Continued)

(52) U.S. Cl.
CPC ............. *H01M 4/96* (2013.01); *H01M 2/162* (2013.01); *H01M 2/1613* (2013.01);
(Continued)

(58) Field of Classification Search
CPC .. H01M 2/204; H01M 10/613; H01M 2/1022; H01M 10/6561; H01M 10/6551;
(Continued)

(56) References Cited

U.S. PATENT DOCUMENTS

| | | | |
|---|---|---|---|
| 2011/0159372 A1 | 6/2011 | Zhamu et al. | |
| 2012/0270115 A1* | 10/2012 | Johnson | H01M 4/96 429/405 |

(Continued)

FOREIGN PATENT DOCUMENTS

| | | |
|---|---|---|
| CN | 102730680 A | 10/2012 |
| CN | 103346022 A | 10/2013 |

(Continued)

OTHER PUBLICATIONS

Machine Translation of CN 104689811, obtained Apr. 22, 2019 (Year: 2015).*

(Continued)

*Primary Examiner* — Nicholas P D'Aniello
(74) *Attorney, Agent, or Firm* — Birch, Stewart, Kolasch & Birch, LLP

(57) ABSTRACT

The present invention relates to a lithium air battery and a method of manufacturing the same, wherein the lithium air battery comprises; a positive electrode which uses oxygen as an anode active material and is formed by laminating carbon black secondary particles which are composed of carbon black primary particles and graphene, and including macropores having a pore size range of exceeding 100 nm formed between the carbon black secondary particles; a negative electrode disposed to face the positive electrode; and a separation membrane disposed between the positive electrode and the negative electrode. The lithium air battery (Continued)

provides an increase in discharge capacity in a discharge test and a decrease in overvoltage, and can be manufactured by a simple method.

14 Claims, 8 Drawing Sheets

(51) Int. Cl.
    H01M 4/86      (2006.01)
    H01M 12/08     (2006.01)
    H01M 4/88      (2006.01)
    H01M 2/16      (2006.01)
    H01M 4/38      (2006.01)
    H01M 12/02     (2006.01)

(52) U.S. Cl.
    CPC ......... *H01M 2/1653* (2013.01); *H01M 4/382* (2013.01); *H01M 4/8605* (2013.01); *H01M 4/8647* (2013.01); *H01M 4/88* (2013.01); *H01M 4/8807* (2013.01); *H01M 12/02* (2013.01); *H01M 12/08* (2013.01); *H01M 2220/20* (2013.01); *H01M 2300/0028* (2013.01); *Y02E 60/128* (2013.01)

(58) Field of Classification Search
    CPC ...... H01M 2220/30; H01M 4/96; H01M 4/88; H01M 2/1653; H01M 2/162; H01M 4/8647; H01M 2/1613; H01M 4/382; H01M 4/8807; H01M 12/02; H01M 4/8605; H01M 12/08; H01M 2220/20; H01M 2300/0028; H01M 4/8828; H01M 10/0568; H01M 10/0569; H01M 4/134; H01M 2300/0025; Y10T 29/49108; Y02E 60/128
    See application file for complete search history.

(56) References Cited

U.S. PATENT DOCUMENTS

| | | |
|---|---|---|
| 2012/0308902 A1 | 12/2012 | Mizuno et al. |
| 2012/0312585 A1 | 12/2012 | Baek et al. |
| 2014/0098461 A1 | 4/2014 | Zhamu et al. |
| 2014/0127596 A1 | 5/2014 | Sun et al. |
| 2015/0175778 A1 | 6/2015 | Nozato et al. |
| 2015/0191357 A1 | 7/2015 | Yang et al. |
| 2015/0280247 A1 | 10/2015 | Garsuch et al. |

FOREIGN PATENT DOCUMENTS

| | | |
|---|---|---|
| CN | 104009205 A | 8/2014 |
| CN | 104689811 A | 6/2015 |
| JP | 2010-86955 A | 4/2010 |
| JP | 2010-212198 A | 9/2010 |
| JP | 2014-62225 A | 4/2014 |
| JP | 2014-182873 A | 9/2014 |
| JP | 2014-188389 A | 10/2014 |
| KR | 10-1114414 B1 | 2/2012 |
| KR | 10-2012-0114317 A | 10/2012 |
| KR | 10-2013-0001170 A | 1/2013 |
| KR | 10-1225143 B1 | 1/2013 |
| KR | 10-2014-0037725 A | 3/2014 |
| KR | 10-1463722 B1 | 11/2014 |
| KR | 10-1487465 B1 | 1/2015 |
| KR | 10-2015-0049279 A | 5/2015 |
| KR | 10-2015-0084920 A | 7/2015 |
| WO | WO 2011/074122 A1 | 6/2011 |
| WO | WO 2015/000152 A1 | 1/2015 |

OTHER PUBLICATIONS

Extended European Search Report, dated Jul. 31, 2018, for European Application No. 16837274.6.
C. K. Park et al., "Electrochemical Performances of Lithium-air Cell with Carbon Materials", Bulletin of the Korean Chemical Society, 2010, vol. 31, No. 11, pp. 3221-3224.
Haegyeom Kim et al., "Graphene for advanced Li/S and Li/air batteries", Journal of Materials Chemistry A, 2014, vol. 2, pp. 33-47.
International Search Report for PCT/KR2016/008937 (PCT/ISA/210) dated Nov. 22, 2016.
Jie Xiao et al., "Hierarchically Porous Graphene as a Lithium-Air Battery Electrode", Nano Letters, 2011, vol. 11, pp. 5071-5078.
Luhan Ye et al., "Lithium-Air Batteries: Performance Interplays with Instability Factors", ChemElectroChem, Mar. 11, 2015, vol. 2, Issue 3, 13 pages.
Robert Black et al., "The Role of Catalysts and Peroxide Oxidation in Lithium-Oxygen Batteries", Angewandte Chemie, 2013, vol. 125, pp. 410-414.
Tao Zhang et al., "Gel-Derived Cation-π Stacking Films of Carbon Nanotube-Graphene Complexes as Oxygen Cathodes", ChemSusChem, Oct. 2014, vol. 7, Issue 10, 9 pages.

* cited by examiner

LITHIUM AIR BATTERY AND MANUFACTURING METHOD THEREFOR

TECHNICAL FIELD

The present invention relates to a lithium air battery and a method of manufacturing the same. More specifically, the present invention provides a lithium air battery and a method of manufacturing the same, which can increase discharge capacity in a discharge test and decrease overvoltage and be manufactured by a simple method.

CROSS REFERENCE TO RELATED APPLICATIONS

This application claims priorities to Korean Patent Application No. 10-2015-0115017 filed on Aug. 14, 2015 and Korean Patent Application No. 10-2016-0103096 filed on Aug. 12, 2016, which are incorporated by reference herein in its entirety.

BACKGROUND ART

A lithium air battery has a weight energy density of about 500 Wh/kg or more which is much higher than that of the current lithium ion battery (200 Wh/kg) or the next generation lithium ion battery (300 Wh/kg). Thus, many researches are underway into the lithium air battery for electric vehicles capable of long-distance driving with a single charge.

A positive electrode of the lithium air battery shows a different discharge capacity depending on the type of carbon. This is because shape and amount of $Li_2O_2$, a discharge product, are changed depending on geometry of pore and structure of the carbon. Among carbon blacks known until now, ketjen black is known as a carbon electrode having the highest capacity. However, problems of the lithium air battery that overvoltage is large during charging and cycle life is short cannot be completely solved by using the ketjen black.

Thus, the research for increasing discharge capacity of the positive electrode and lowering overvoltage during charging/discharging is one of the important themes in the study of the positive electrode for developing a method of increasing capacity and cycle life of the lithium air battery.

DISCLOSURE

Technical Problem

An object of the present invention is to solve the aforementioned problems of prior art and to provide a lithium air battery which can increase discharge capacity in a discharge test and decrease overvoltage and be manufactured by a simple method.

Another object of the present invention is to provide a method of manufacturing the lithium air battery.

Technical Solution

One embodiment of the present invention provides a lithium air battery, which comprises a positive electrode which uses oxygen as a positive electrode active material, is formed by laminating carbon black secondary particles consisting of carbon black primary particles and graphene, and including pores having a pore size range of exceeding 100 nm formed between the carbon black secondary particles; a negative electrode disposed to face the positive electrode; and a separator disposed between the positive electrode and the negative electrode.

The carbon black primary particles may be spherical in the size range of 1 nm to 500 nm.

The graphene may have plate-shaped in the size range of 0.1 μm to 50 μm and in the thickness range of 0.34 nm to 20 nm.

The carbon black secondary particles may be spherical in the size range of 500 nm to 10 μm.

The carbon black secondary particles may have structure that the plate-shaped graphene is surrounded by the spherical carbon black primary particles.

On a surface of the carbon black secondary particles, an area occupied by the spherical carbon black primary particles may be larger than that occupied by the plate-shaped graphene.

The carbon black secondary particles may comprise 1 to 99% by weight of the carbon black primary particles and 1 to 99% by weight of the graphene.

The carbon black secondary particles may be prepared by dispersing the carbon black primary particles and the graphene in a solvent and then spray-drying them.

The carbon black secondary particles may include the pores having a pore size range of 20 to 100 nm formed between the carbon black primary particles and the graphene, the pores having a pore size range of less than 10 nm formed inside the carbon black primary particles, and the pores having a pore size range of less than 10 nm formed inside the graphene.

The positive electrode has an average pore size measured by mercury porosimetry may be exceeding 100 nm to 10 μm or less.

The carbon black may be one selected from the group consisting of ketjen black, super p, denka black, acetylene black, furnace black, and mixtures thereof.

The graphene may be one selected from the group consisting of graphene plate (GNP), graphene oxide (GO), reduced graphene oxide (rGO), and mixtures thereof.

The positive electrode may further comprise a gas diffusion layer on which the carbon black secondary particles are laminated.

The gas diffusion layer may comprise an active material consisting of carbon cloth, carbon paper, carbon felt, or an oxygen-selective permeable membrane.

The negative electrode may be one selected from the group consisting of a lithium metal, a lithium metal composite treated with an organic or inorganic compound, lithiated metal-carbon composite, and mixtures thereof.

The separator may include one selected from the group consisting of polyethylene membrane, polypropylene membrane and glass fiber membrane.

The lithium air battery may further comprise one electrolyte selected from the group consisting of aqueous electrolyte, non-aqueous electrolyte, organic solid electrolyte, inorganic solid electrolyte, and mixtures thereof.

Another embodiment of the present invention provides a method of manufacturing a lithium air battery which comprises the steps of dispersing carbon black primary particles in a solvent to prepare a first dispersion; dispersing graphene in a solvent to prepare a second dispersion; mixing the first dispersion and the second dispersion to prepare a slurry; spray-drying the slurry to prepare carbon black secondary particles; and laminating the carbon black secondary particles on a gas diffusion layer to prepare a positive electrode.

The spray-drying may be carried out by spraying the slurry to form droplets in the size range of 10 to 500 μm and by removing the solvent of the droplets.

The carbon black secondary particles may be applied to the gas diffusion layer in the amount of 0.1 to 10 mg/cm².

Advantageous Effects

The lithium air battery of the present invention can increase discharge capacity in a discharge test and decrease overvoltage and be manufactured by a simple method.

BEST MODE

Figure 1:
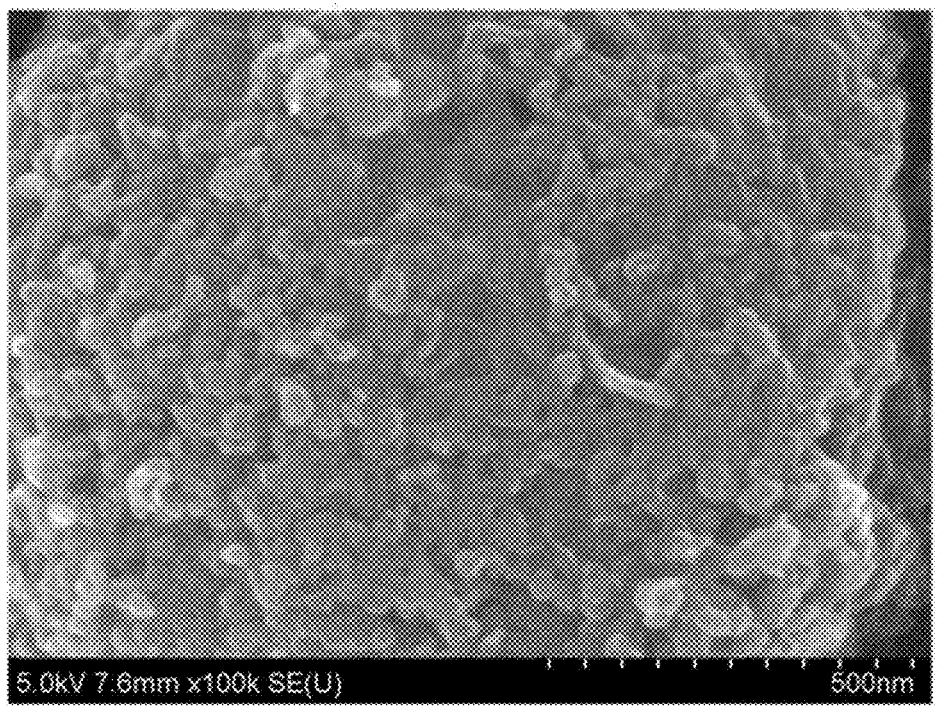
FIGS. 1 and 2 are photographs of observing the carbon black secondary particles prepared in Example 1 of the present invention by Scanning Electron Microscope.
Figure 2:
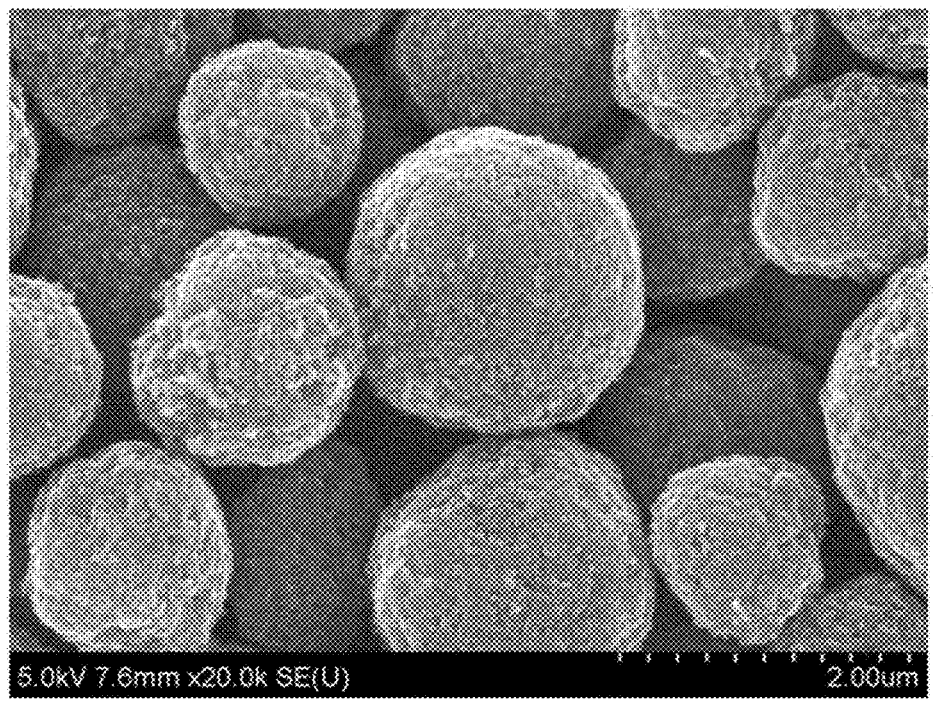
Figure 3:
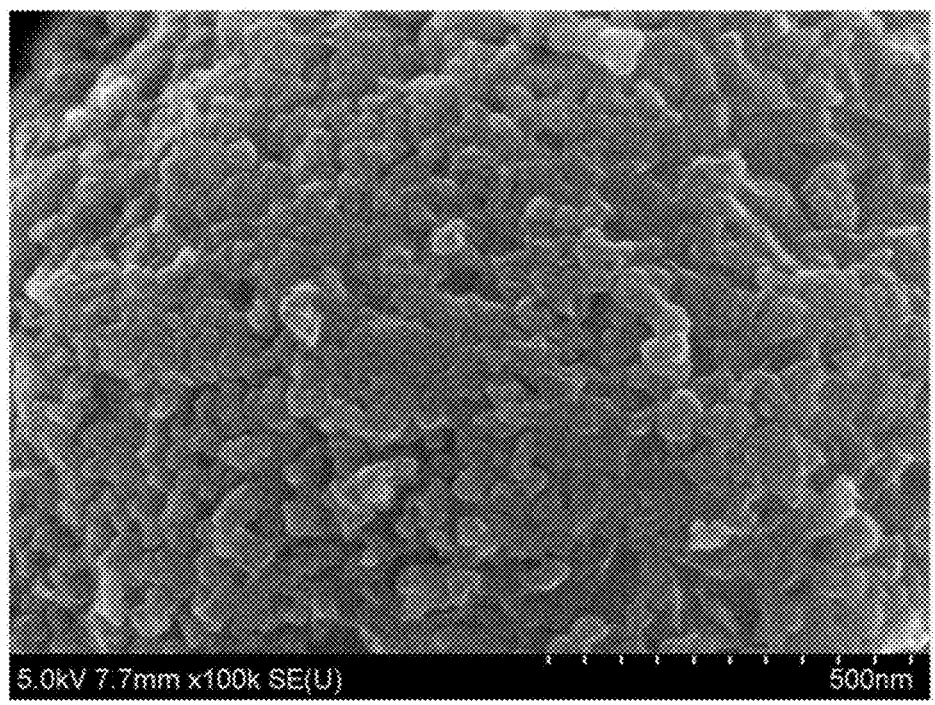
FIGS. 3 and 4 are photographs of observing the carbon black secondary particles prepared in Example 4 of the present invention by Scanning Electron Microscope.
Figure 4:
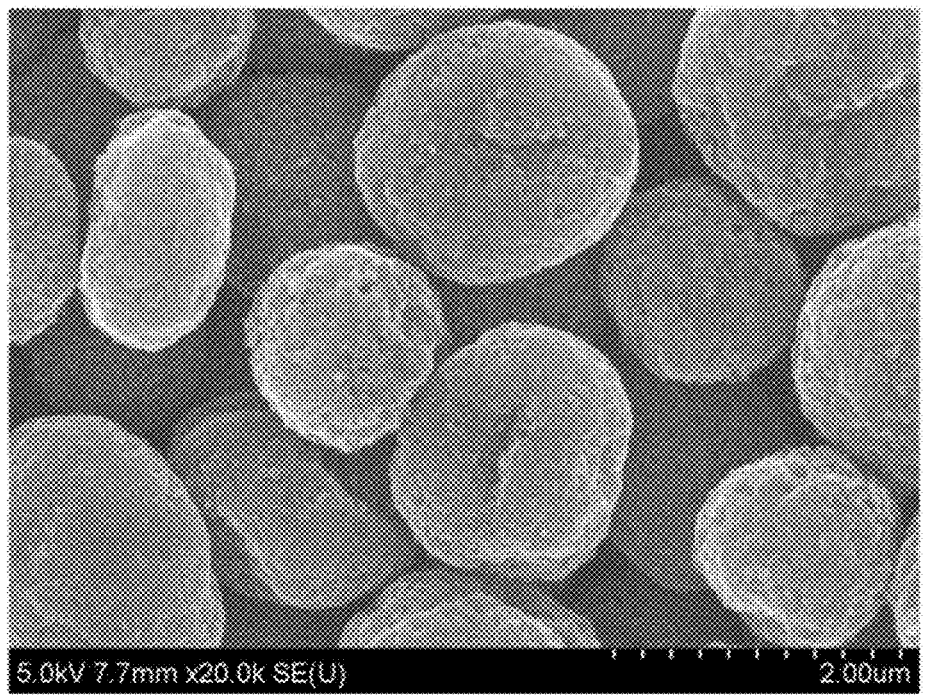
Figure 5:
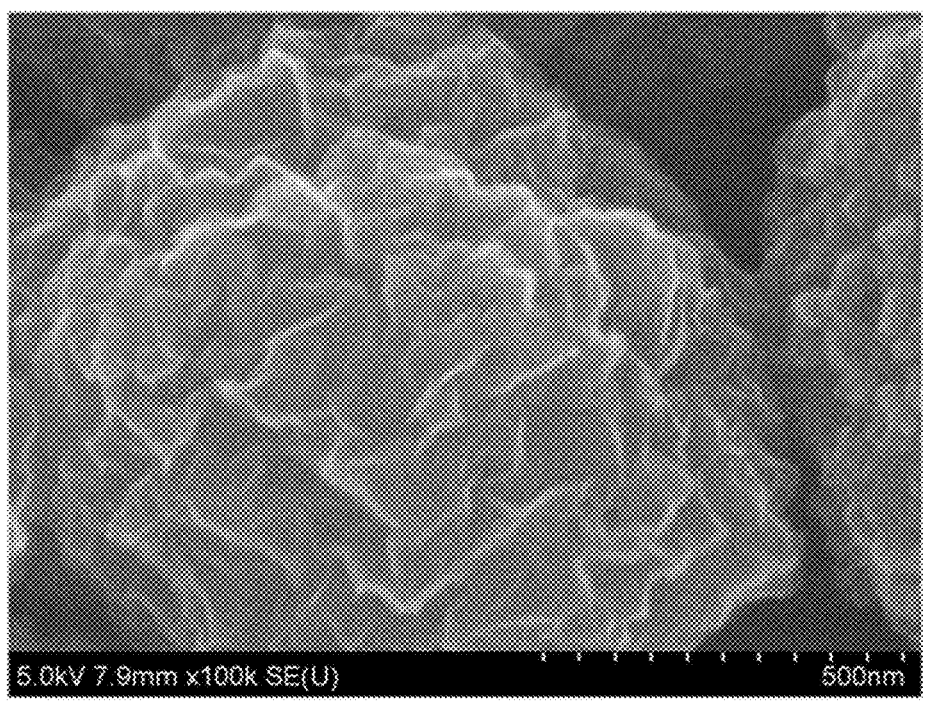
FIGS. 5 and 6 are photographs of observing the carbon black secondary particles prepared in Example 6 of the present invention by Scanning Electron Microscope.

The lithium air battery according to one embodiment of the present invention comprises a positive electrode which uses oxygen as a positive electrode active material, is formed by laminating carbon black secondary particles consisting of carbon black primary particles and graphene, and including pores having a pore size range of exceeding 100 nm formed between the carbon black secondary particles; a negative electrode disposed to face the positive electrode; and a separator disposed between the positive electrode and the negative electrode.

Mode for Invention

Hereinafter, the present invention will be explained more in detail.

The term "air" as used herein is not limited to the atmospheric air, and may include the gas combination comprising oxygen, or the pure oxygen gas. This broad definition for the term air may be applied to all uses, such as for example, air battery, air positive electrode, and the like.

The term "spherical" as used herein does not mean to be perfectly spherical, but means, to some degree, to be substantially spherical. In other words, it includes those whose cross section is circular or oval, and also includes all the cases which do not have a perfect symmetry but rather have a distorted shape, a non-smooth surface, or a rough and angled shape as long as they are recognized as being spherical as a whole. More specifically, the spherical may mean to have sphericity (ψ) as defined by the following Equation 1 of 0.9 or more, but the present invention is not limited thereto.

$$\Psi = \frac{2^3 \sqrt{ab^2}}{a + \frac{b^2}{\sqrt{a^2-b^2}} \ln\left(\frac{a+\sqrt{a^2-b^2}}{b}\right)}$$ [Equation 1]

(In Equation 1 above, a is a radius of the longest axis, and b is a radius of the shortest axis)

A lithium air battery according to one embodiment of the present invention comprises a positive electrode which uses oxygen as a positive electrode active material, is formed by laminating carbon black secondary particles consisting of carbon black primary particles and graphene, and including pores having a pore size range of exceeding 100 nm formed between the carbon black secondary particles; a negative electrode disposed to face the positive electrode; and a separator disposed between the positive electrode and the negative electrode.

As the aforementioned positive electrode of the lithium air battery is formed by laminating carbon black secondary particles consisting of carbon black primary particles and graphene, compared with positive electrodes of conventional lithium air batteries, structure and shape of the pores and size and structure of the particles are improved, so that discharge capacity increases in a discharge test and overvoltage decreases.

The carbon black primary particles have spherical in the size range of 1 nm to 500 nm, and the graphene has plate-shaped in the size range of 0.1 μm to 50 μm and the thickness range of 0.34 nm to 20 nm, preferably the size range of 0.5 to 10 μm and the thickness range of 1 nm to 3 nm.

It may be difficult to produce suitable pores of 10 nm or less inside the secondary particles due to the fine particles when the size of carbon black primary particles is less than 1 nm, and it may be difficult to form mesopores having a pore size range of 20 to 100 nm inside the secondary particles when the size of carbon black primary particles exceeds 500 nm.

Since one sheet of the general graphene has the thickness of 0.34 nm, it may be impossible that the graphene formed as a lamination of graphene sheets has the thickness range of less than 0.34 nm. Also, when the graphene has the size range of above 50 μm or the thickness range of above 20 nm, problems as nozzle clogging, etc. may occur during spray-drying.

Furthermore, since the carbon black secondary particles consist of the carbon black primary particles and the graphene, they may be spheres in the size range of 500 nm to 10 μm, preferably 1 to 3 μm. The advantage given by the secondary structure, pores of above 100 nm, may be declined when the size of carbon black secondary particles is less than 500 nm, and the content of binder may be increased since the electrode should be laminated thick for increasing the loading of electrode when the size thereof exceeds 10 μm.

The carbon black secondary particles comprise 1 to 99% by weight of the carbon black primary particles and 1 to 99% by weight of the graphene. It is preferable that the carbon black secondary particles include the carbon black primary particles in a larger amount than that of the graphene. Specifically, it is more preferable that they comprise the carbon black primary particles in the amount of 50% by weight or more and 99% by weight or less and the graphene in the amount of 1% by weight or more and less than 50% by weight.

In other words, in case that the carbon black secondary particles comprise the carbon black primary particles more than the graphene, the carbon black secondary particles may have structure that the plate-shaped graphene is surrounded by the spherical carbon black primary particles. When the carbon black secondary particles have such a structure, there may be provided an effect of increased discharge capacity along with highly decreased overvoltage. This is because the carbon black primary particles are agglomerated together with the graphene while they retain their shape and pore structure as it is.

Since the carbon black secondary particles have the structure that the plate-shaped graphene is surrounded by the spherical carbon black primary particles, the carbon black primary particles may be observed more than the graphene on a surface of the carbon black secondary particles. It may also be measured that the area occupied by the spherical carbon black primary particles is larger than that occupied by the plate-shaped graphene. At this time, in the surface of the carbon black secondary particles, the area occupied by the carbon black primary particles may be 50% or more, preferably 55 to 75%. Only, the area ratio between the carbon black primary particles and the graphene may differ depending on the distribution of the graphene in the carbon black secondary particles. For example, under the assumption that the graphene is distributed between the carbon black primary particles in the thickness of 1 sheet, the best battery performance may be expected when the area ratio between the carbon black primary particles and the graphene is within the aforementioned range.

The surface profile of the carbon black secondary particles may be observed by Scanning Electron Microscopy (SEM) and the like. When the carbon black primary particles are present more than the graphene on the surface, the carbon black secondary particles have the shape that small spherical particles are agglomerated on their surface. If the graphene is present more than the carbon black primary particles on the surface, the carbon black secondary particles have the crumpled shape on their surface.

The positive electrode is formed through the lamination of the carbon black secondary particles in the size range of 500 nm to 10 µm, and thus it includes pores having a pore size range of exceeding 100 nm formed between the carbon black secondary particles.

The positive electrode formed through the lamination of the carbon black secondary particles may have an average pore size range of above 100 nm, preferably from exceeding 100 nm to 10 µm or less, more preferably from exceeding 300 nm to 10 µm or less, much more preferably from above 300 nm to 2 µm when measured by mercury (Hg) porosimetry of positive electrode, i.e., when measured by using a Hg porosimeter (Micromeritics Ltd.) under the pressure condition of 0.1 psi to 60,000 psi. The mercury porosimetry is a method of measuring a pore volume by the amount of mercury introduced to the pore under the condition of constant pressure. If the pore is smaller, the higher pressure is needed to impregnate mercury.

The pores of electrode may be blocked due to the product of charging/discharging when the average pore size is 100 nm or less. As a consequence, problems in the mass transfer of an electrolyte, a lithium ion, and the like may occur. When the pore size exceeds 10 µm, the electrode may be weakened as well as the specific surface area to which the product of charging/discharging is loaded may be reduced to lower energy density.

The carbon black secondary particles are formed by the agglomeration of carbon black primary particles without any damage on the particle structure and pore shape thereof, and thus they may include the pores having a pore size range of 20 to 100 nm formed between the carbon black primary particles and the graphene, the poreshaving a pore size range of less than 10 nm formed inside the carbon black primary particles, and the pores having a pore size range of less than 10 nm formed inside the graphene.

On the other hand, when the carbon black secondary particles comprise the graphene more than the carbon black primary particles, the carbon black secondary particles may have the structure that the spherical carbon black primary particles are surrounded by the plate-shaped graphene, and the pore structure of the carbon black primary particles is damaged to reduce the effective surface area of the carbon black secondary particles contributing to the battery performance.

The carbon black secondary particles may be obtained by any method capable of providing the secondary particles by agglomerating the carbon black primary particles and the graphene, and the method is not particularly limited in the present invention. As a specific example, the carbon black secondary particles may be prepared by a method of dispersing the carbon black primary particles and the graphene in a solvent and then spray-drying them.

The spray-drying may be carried out by spraying slurry through a nozzle to form droplets in the size range of 10 to 500 µm and then by removing the solvent of the droplets. In the spray-drying, the aspirator power or the feed rate may be controlled depending on the viscosity of slurry and the drying temperature.

By using the spray-drying, the carbon black primary particles and the graphene dispersed in the solvent may be sprayed under the hot air and rapidly dried while being conveyed using the heated air to give the carbon black secondary particles having a high circularity.

The above drying may be carried out under the condition capable of removing the dispersion solvent of the slurry, for example, under the condition of 100° C. (the boiling point of water) or higher when water is used as a solvent. If the drying is carried out below the boiling point, the solvent may not be easily evaporated to cause the problem of not being dried after spraying.

The carbon black primary particles may be any one selected from the group consisting of ketjen black, super p, denka black, acetylene black, furnace black, and mixtures thereof.

The graphene may be one selected from the group consisting of graphene plate (GNP), graphene oxide (GO), reduced graphene oxide (rGO), and mixtures thereof.

The positive electrode may further comprise a gas diffusion layer on which the carbon black secondary particles are laminated. The gas diffusion layer is not particularly limited in the present invention, and may include carbon cloth, carbon paper, carbon felt, an oxygen-selective permeable membrane, or the like.

In addition, the positive electrode may further comprise a porous current collector, and in this case the gas diffusion layer may be formed in the following manner: For example, it may be prepared by a method of attaching carbon cloth, carbon paper, carbon felt, an oxygen-selective permeable membrane, or the like on the surface of porous current collector. However, the present invention is not limited to such a method.

The porous current collector may be one selected from the group consisting of three-dimensional nickel foam, planar nickel mesh, aluminum mesh, carbon paper, carbon foam, aluminum foam, and mixtures thereof.

In addition, the positive electrode may further optionally comprise a catalyst for oxidation/reduction of oxygen, and this catalyst may be one selected from the group consisting of metals such as Pt, Pd, Ru, Rh, Ir, Ag, Au, Ti, V, Cr, Mn, Fe, Ni, Co, Cu, Mo, W, Zr, Zn, Ce, La, oxides thereof, and complexes thereof.

In addition, the catalyst may be supported on a carrier. The carrier may be one selected from the group consisting of oxide, zeolite, clay-based mineral, carbon, and mixtures thereof. The oxide may be an oxide such as alumina, silica, zirconium oxide, titanium dioxide, and the like, or an oxide comprising one or more metals selected from Ce, Pr, Sm, Eu, Tb, Tm, Yb, Sb, Bi, V, Cr, Mn, Fe, Co, Ni, Cu, Nb, Mo and W. The carbon may be carbon black such as ketjen black, acetylene black, channel black, lamp black, and the like, graphite such as natural graphite, artificial graphite, expanded graphite, and the like, activated carbon, carbon fiber, etc., but not necessarily limited thereto. Any one capable of being used as a carrier in the art to which the present invention pertains is all available.

A negative electrode capable of intercalation and deintercalation of lithium may comprise a lithium metal, a lithium metal composite treated with an organic or inorganic compound, a lithiated metal-carbon composite, or the like.

The negative electrode may comprise a current collector, and any current collector known in the art may be used without limit. For example, a metal plate of stainless steel, nickel, aluminum, etc., or a carbon paper may be used. The current collector may be coated with an oxidation-resistant metal or an alloy film in order to prevent oxidation.

The separator is not particularly limited in the present invention, and may include one selected from the group consisting of polyethylene membrane, polypropylene membrane, glass fiber membrane, and the like.

In addition, the lithium air battery may further comprise an electrolyte. This electrolyte is not particularly limited in the present invention, and may be one selected from the group consisting of aqueous electrolyte, non-aqueous electrolyte, organic solid electrolyte, inorganic solid electrolyte, and mixed forms thereof.

The non-aqueous electrolyte may include an aprotic solvent. The aprotic solvent, for example, may be one selected from the group consisting of a carbonate-based, an ester-based, an ether-based, a ketone-based, an amine-based, a phosphine-based solvent, and their combinations.

The ether-based solvent includes acyclic ethers or cyclic ethers.

A non-limiting example of the acyclic ether may be one selected from the group consisting of 1,2-dimethoxyethane, 1,2-diethoxyethane, 1,2-dibutoxyethane, diethylene glycol dimethyl ether, diethylene glycol diethyl ether, triethylene glycol dimethyl ether, triethylene glycol diethyl ether, tetraethylene glycol dimethyl ether, tetraethylene glycol diethyl ether, dimethyl sulfoxide, N,N-dimethyl acetamide, and their combinations.

In addition, a non-limiting example of the cyclic ether may be one compound selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyl tetrahydrofuran, 2,5-dimethyl tetrahydrofuran, 2,5-dimethoxy tetrahydrofuran, 2-ethoxy tetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, isosorbide dimethyl ether, and mixtures thereof.

The electrolyte may comprise a lithium salt dispersed in the above non-aqueous organic solvent.

As the lithium salt, those capable of being conventionally applied to a lithium air battery may be used without particular limit. Preferably, the lithium salt may be one compound selected from the group consisting of LiSCN, LiBr, LiI, $LiPF_6$, $LiBF_4$, $LiSbF_6$, $LiAsF_6$, $LiCH_3SO_3$, $LiCF_3SO_3$, $LiClO_4$, Li $(Ph)_4$, LiC $(CF_3SO_2)_3$, LiN $(CF_3SO_2)_2$, LiN $(C_2F_5SO_2)_2$, LiN $(SFO_2)_2$, LiN $(CF_3CF_2SO_2)_2$, and mixtures thereof.

For example, the organic solid electrolyte may be one selected from the group consisting of polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers having an ionic dissociation group, and combinations thereof.

For example, the inorganic solid electrolytes may be one compound selected from the group consisting of $Li_3N$, LiI, $Li_5NI_2$, $Li_3N$-LiI-LiOH, $LiSiO_4$, $LiSiO_4$-LiI-LiOH, $Li_2SiS_3$, $Li_4SiO_4$, $Li_4SiO_4$-LiI-LiOH, $Li_3PO_4$-$Li_2S$-$SiS_2$, and nitrides, halides or sulfates of Li, and mixtures of one or more thereof.

In addition, the electrolyte may further optionally comprise one redox mediator selected from the group consisting of LiI, NaI and KI. When the electrolyte further comprises the redox mediator, the overvoltage may be reduced during charging of the lithium air battery.

The electrolyte may be impregnated in the separator, or a part thereof may be absorbed in the positive electrode or the negative electrode besides the separator.

The method of manufacturing the lithium air battery according to another embodiment of the present invention comprises the steps of dispersing carbon black primary particles in a solvent to prepare a first dispersion; dispersing graphene in a solvent to prepare a second dispersion; mixing the first dispersion and the second dispersion to prepare a slurry; spray-drying the slurry to give carbon black secondary particles; and laminating the carbon black secondary particles on a gas diffusion layer to give a positive electrode.

First, the carbon black primary particles are dispersed in a solvent to prepare the first dispersion.

The carbon black primary particle may be one selected from the group consisting of ketjen black, super p, denka black, acetylene black, furnace black, and mixtures thereof.

The first dispersion may further optionally comprise a dispersant in order to improve the dispersibility of the carbon black primary particles.

The dispersant may be carboxymethyl cellulose (CMC), but the present invention is not limited thereto. The first dispersion may include the dispersant in the amount of 30% by weight or less, preferably 1 to 30% by weight, based on a total weight of the slurry.

The solvent may include water, acetonitrile, methanol, ethanol, tetrahydrofuran, isopropyl alcohol, N-methylpyrrolidone, and the like, preferably water, but the present invention is not limited thereto.

On the other hand, the graphene is dispersed in a solvent to prepare the second dispersion.

The graphene may be one selected from the group consisting of graphene plate (GNP), graphene oxide (GO), reduced graphene oxide (rGO), and mixtures thereof.

The solvent may include water, acetonitrile, methanol, ethanol, tetrahydrofuran, isopropyl alcohol, N-methylpyrrolidone, and the like, preferably water, but the present invention is not limited thereto.

The first dispersion and the second dispersion as prepared above are mixed to prepare the slurry. In this embodiment, it is described that the first dispersion and the second dispersion are prepared separately and then mixed, but the present invention is not limited thereto. In other words, the second dispersion is not separately prepared, and the graphene may be added to the first dispersion to prepare the slurry. Or, the first dispersion is not separately prepared, and the carbon black primary particles may be added to the second dispersion to prepare the slurry.

The slurry may comprise 1 to 99% by weight of the carbon black primary particles and 1 to 99% by weight of the graphene, preferably 50% by weight or more and 99% by weight or less of the carbon black primary particles and 1% by weight or more and less than 50% by weight of the graphene based on the total weight of the slurry.

Next, the slurry as prepared above is spray-dried to prepare the carbon black secondary particles.

The step of spray-drying the slurry may be carried out by spraying the slurry through a nozzle to form droplets in the size range of 10 to 500 μm and then by removing the solvent of the droplets. Optionally, the carbon black secondary particles as formed above are heated to remove the dispersant through carbonization. The heating may be carried out for 1 to 6 hours at 400 to 1000° C. The dispersant may not be sufficiently decomposed when the heating temperature is less than 400° C., and the heating at above 1000° C. is unnecessary. The dispersant may not be sufficiently decomposed or the graphene may not be sufficiently reduced when the heating time is less than 1 hour, and the heating for a long time period of above 6 hour is unnecessary.

Finally, the carbon black secondary particles as prepared above are laminated on the gas diffusion layer to give a positive electrode.

As the method of laminating the carbon black secondary particles on the gas diffusion layer, any method capable of loading a carbon material such as conventional carbon black primary particles on a gas diffusion layer can be used. Specifically, the carbon black secondary particles as prepared above may be dispersed in N-methylpyrrolidone (NMP) or the like and then applied on the gas diffusion layer, but the present invention is not limited thereto.

At this time, the carbon black secondary particles may be applied to the gas diffusion layer in the amount of 0.1 to 10 mg/cm$^2$, preferably 1 to 5 mg/cm$^2$. The amount of current of a battery may be small to cause the low energy density when the carbon black secondary particles are applied in the amount of less than 0.1 mg/cm$^2$, and the uniform distribution of oxygen or the electrolyte may not be achieved due to their diffusion when the amount applied is above 10 mg/cm$^2$.

The positive electrode according to another embodiment of the present invention is formed by laminating the carbon black secondary particles consisting of carbon black primary particles and graphene, and thus it shows more increased discharge capacity in a discharge test and more decreased overvoltage than the positive electrodes of the existing lithium air batteries through the improvements in the structure and shape of pores and the size and structure of particles.

Hereinafter, preferable examples and comparative examples are provided to help the understanding of the present invention. However, the following examples are merely to illustrate the present invention and not to limit the scope thereof.

PREPARATIVE EXAMPLE

Preparation of a Lithium Air Battery

Example 1

The carbon black primary particles of ketjen black (EC-600 JD) and the dispersant of carboxymethyl cellulose (CMC) were dispersed in water in the weight ratio of 9:1 to prepare a dispersion of carbon black primary particles in the content of 5% by weight.

The solution wherein 2% by weight of GO was dispersed in water was diluted to the concentration of 2 mg/ml.

The aqueous dispersion of carbon black primary particles and the aqueous dispersion of GO were mixed. At this time, the aqueous dispersion of carbon black primary particles and the aqueous dispersion of GO were mixed so that the weight ratio of carbon black primary particles to graphene (KB-rGO) was 250:20 in the finally prepared carbon black secondary particles.

The resulting product was dispersed for 3 hours in a bath sonication and spray-dried to prepare the carbon black secondary particles having a secondary particle structure. At this time, the spray-drying was carried out at 180° C. under the conditions of aspirator power 90% and feed rate 12 (Bushi spray dryer B-290).

The prepared carbon black secondary particles were carbonized at 600° C. for 2 hours to reduce GO and to remove the dispersant.

Thus prepared carbon black secondary particles were dispersed in NMP in the concentration of 5% by weight and applied on a carbon paper in the loading amount of about 0.5 mg/cm$^2$ to prepare a positive electrode. A glass fiber paper in the thickness of 400 μm as a separator and a lithium metal in the thickness of 150 μm as a negative electrode were prepared, and 1.0 M of LiTFSI (LiN(CF$_3$SO$_2$)$_2$) as a lithium salt was added to tetraethylene glycol dimethyl ether (TEGDME) as an ether-based solvent to prepare an electrolyte.

The electrolyte was impregnated into the separator. The positive electrode, the separator impregnated with the electrolyte, and the lithium negative electrode as prepared above were placed in a battery case to prepare a lithium air battery.

Example 2

The same procedure as Example 1 was carried out to prepare a lithium air battery except that the aqueous dispersion of carbon black primary particles and the aqueous dispersion of GO were mixed so that the weight ratio of carbon black primary particles to graphene (KB-rGO) was 250:40 in the finally prepared carbon black secondary particles.

Example 3

The same procedure as Example 1 was carried out to prepare a lithium air battery except that the aqueous dispersion of carbon black primary particles and the aqueous dispersion of GO were mixed so that the weight ratio of carbon black primary particles to graphene (KB-rGO) was 250:100 in the finally prepared carbon black secondary particles.

Example 4

The same procedure as Example 1 was carried out to prepare a lithium air battery except that the aqueous dispersion of carbon black primary particles and the aqueous dispersion of GO were mixed so that the weight ratio of carbon black primary particles to graphene (KB-rGO) was 250:200 in the finally prepared carbon black secondary particles.

Example 5

The same procedure as Example 1 was carried out to prepare a lithium air battery except that the aqueous dispersion of carbon black primary particles and the aqueous dispersion of GO were mixed so that the weight ratio of carbon black primary particles to graphene (KB-rGO) was 250:300 in the finally prepared carbon black secondary particles.

Example 6

The same procedure as Example 1 was carried out to prepare a lithium air battery except that the aqueous dispersion of carbon black primary particles and the aqueous dispersion of GO were mixed so that the weight ratio of carbon black primary particles to graphene (KB-rGO) was 250:400 in the finally prepared carbon black secondary particles.

Reference Example

The carbon black primary particles of ketjen black was used without adding the separate graphene to prepare a positive electrode in the same manner of loading as Example 1, and the same procedure as Example 1 was carried out to prepare a lithium air battery.

Test Example 1

Structure Analysis of the Prepared Carbon Black Secondary Particle

The carbon black secondary particles prepared in Examples 1, 4 and 6 were examined by a Scanning Electron Microscopy, and the results are shown in FIGS. 1 to 6.

Figure 6:
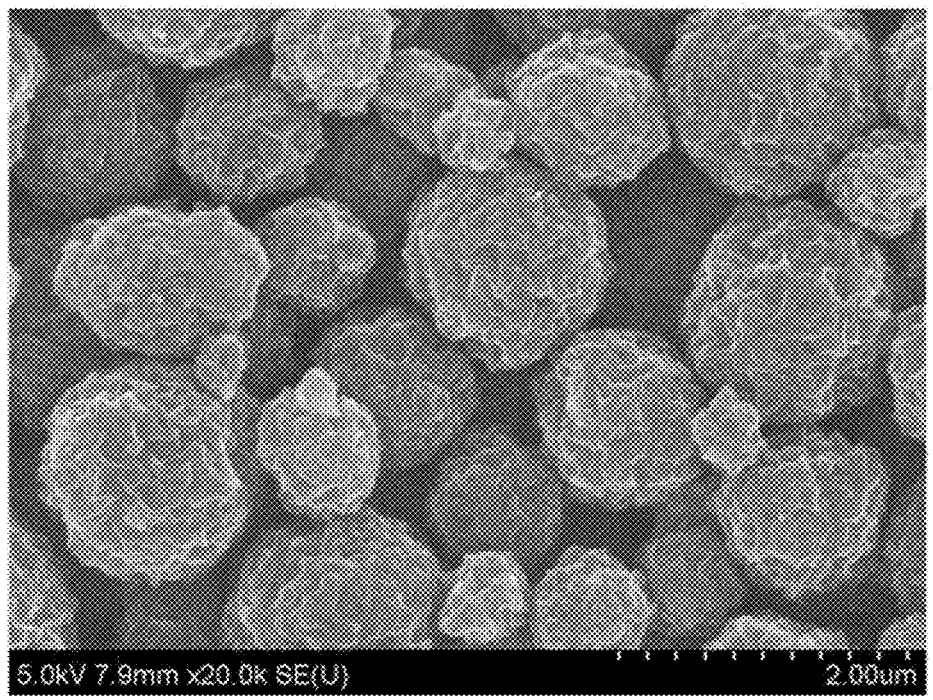

Referring to FIGS. 1 and 6, the carbon black secondary particles have the shape that small spherical particles are agglomerated on their surface when the carbon black secondary particles include the carbon black primary particles more than the graphene. It may also be confirmed that the carbon black secondary particles have the crumpled shape on their surface when the graphene is present on the surface more than the carbon black primary particles.

Test Example 2

Structure Analysis of the Prepared Positive Electrode

A positive electrode was formed by laminating the carbon black secondary particles as prepared in the examples above, the positive electrode was applied on a carbon paper, and the average pore size of the positive electrode under the pressure condition of 0.1 psi to 60,000 psi was measured by using the Hg porosimeter of Micromeritics Co.

The average pore size of the positive electrode of Example 1 was 1048.3 nm, and that of the positive electrode of Reference Example was 263.5 nm. Also, the average pore size of the carbon paper used in the preparation of the electrode was measured to be 60480.4 nm.

Referring to the above data, it was confirmed that larger pores were formed in the positive electrode of Example 1 to which the secondary particles were introduced than in the positive electrode of Reference Example which consisted of the primary particles only. This pore size cannot be obtained by the existing methods. Also, it could be seen that such increase of average pore size in the positive electrode was not influenced by the carbon paper.

Test Example 3

Performance Analysis 1 of the Prepared Lithium Air Battery

Figure 7:
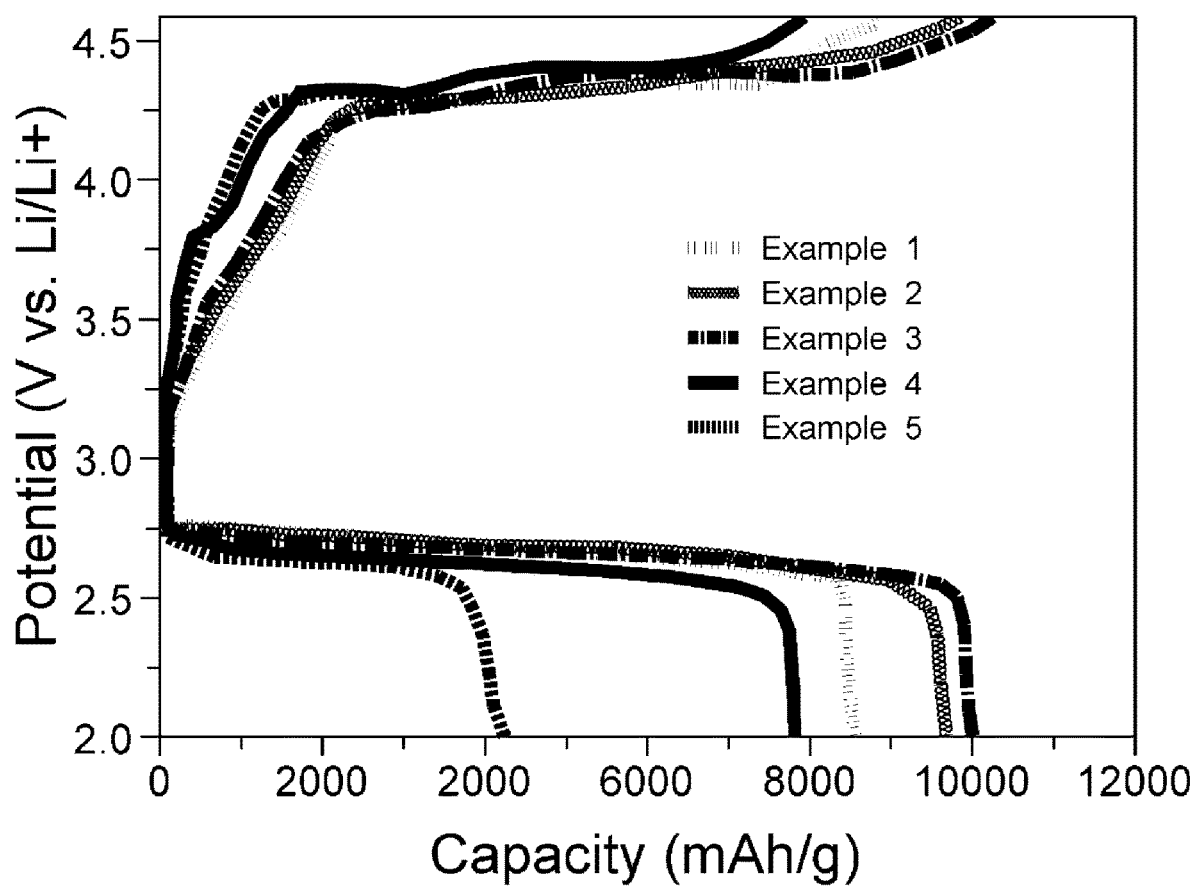
FIG. 7 is a graph illustrating the discharge capacity of the lithium air battery prepared in an example of the present invention.

The discharge capacity was evaluated according to the following method for the lithium air batteries prepared in the above examples, and the results are shown in FIG. 7.

The lithium air batteries prepared in the above examples were placed inside a box capable of electrochemical measurement. The box was adjusted to maintain the oxygen pressure of 1 atm and the constant temperature of 25° C.

The discharge capacity was measured by an electrochemical method using the wires of positive electrode and negative electrode connected to the outside of the box, wherein the current was applied to each cell in the amount of 100 mA/g with respect to the amount of coated carbon to measure the discharge capacity.

As depicted in FIG. 7, it was confirmed that since the positive electrodes of the lithium air batteries prepared in the examples were formed by laminating carbon black secondary particles consisting of carbon black primary particles and graphene, they showed more increased discharge capacity in a discharge test and more decreased overvoltage than the positive electrodes of the existing lithium air batteries through the improvements in the structure and shape of pores and in the size and structure of particles.

Furthermore, it was confirmed that the carbon black secondary particles have the structure that the plate-shaped graphene is surrounded by the spherical carbon black primary particles when the carbon black secondary particles comprise the carbon black primary particles more than the graphene, and also confirmed that such effects as increased discharge capacity along with highly decreased overvoltage can be provided when they have such a structure. It was assumed that this is because the carbon black primary particles are agglomerated together with the graphene while they retain their shape and pore structure as they are.

Test Example 4

Performance Analysis 2 of the Prepared Lithium Air Battery

Figure 8:
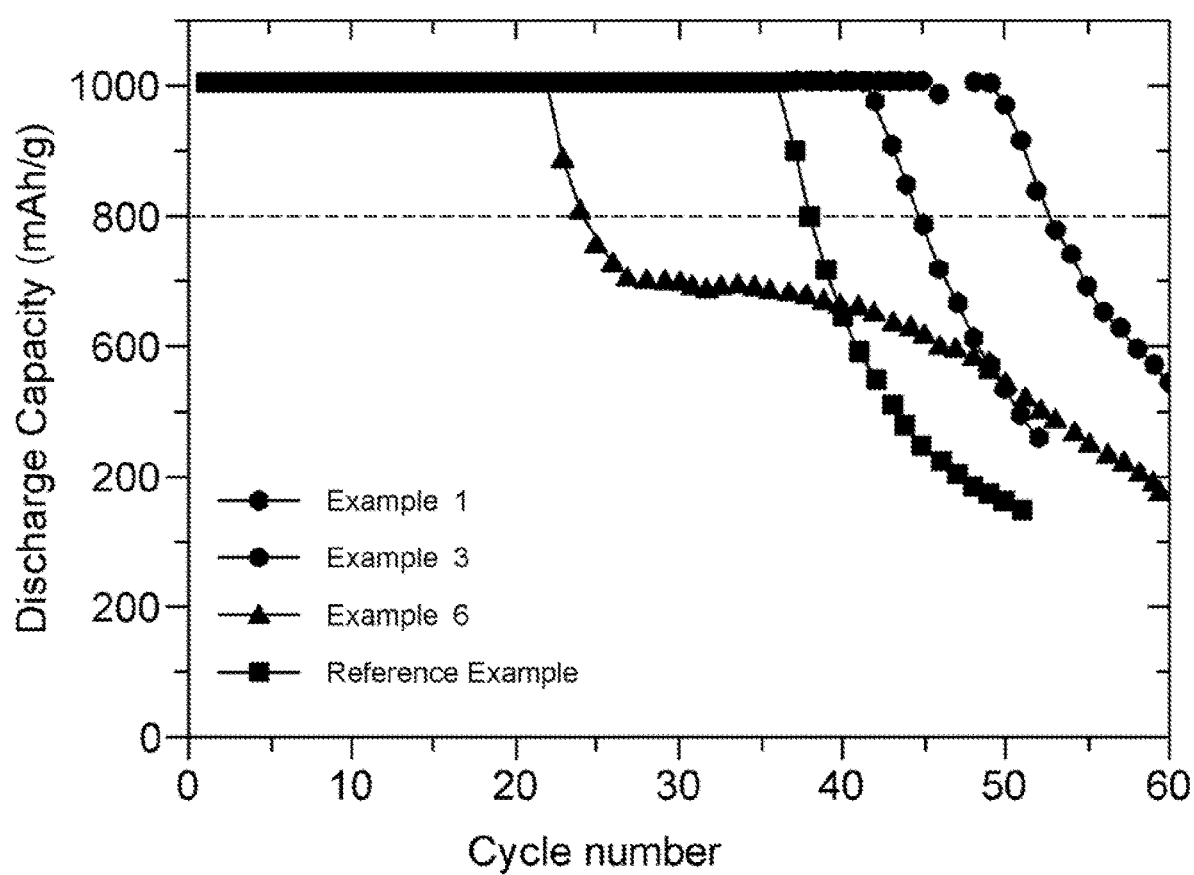
FIG. 8 is a graph illustrating the cycle characteristics of the lithium air battery measured in Experiment 3 of the present invention.

The lithium air batteries prepared in Examples 1, 3 and 6 and Reference Example were measured for their cycle characteristics by subjecting them to charge/discharge under the condition of 0.3 C discharge/0.1 C charge in the driving voltage range of 2.0 to 4.6 V, and the results are shown in FIG. 8.

As depicted in FIG. 8, it was confirmed that the performance was not continuously enhanced as the content of graphene was increased. In other words, it could be seen that the performance was enhanced until Example 3 of which weight ratio of carbon black primary particle to graphene was 250:100, but the carbon black secondary particles were changed to have the structure that the sheet-shaped graphene surrounded the spherical carbon black primary particles as the content of graphene was more increased. In this case, as could be seen from the charge/discharge data of FIG. 7, the discharge capacity started to be decreased when the content of graphene was 200 or 300. Also, as could be seen from the cycle characteristics of FIG. 8, the life span characteristic of Example 6 having the graphene content of 400 was declined.

The desirable examples of the present invention are described in detail above. However, the scope of the present invention is not limited thereto. Various changes and modifications by one of ordinary skill in the art from the basic concept of the present invention as defined in the following claims also fall within the scope of the present invention.

Industrial Applicability

The present invention relates to a lithium air battery and a method of manufacturing the same. More specifically, the present invention provides a lithium air battery and a method of manufacturing the same, wherein the battery shows increased discharge capacity in a discharge test and decreased overvoltage and it can be manufactured by a simple method.

The lithium air battery according to one embodiment of the present invention is a battery for electric vehicles capable of a long-distance driving and thus many researches have been going thereon.

Besides the above vehicle industry, the lithium air battery is available for the storage, transfer and development of energy in such industrial fields as architecture and power generation industry, electrical and electronic industry, chemical industry, communication industry, robot industry, and the like including the smart grid.

The invention claimed is:

1. A lithium air battery comprising:
a positive electrode, which comprises a laminate on a gas diffusion layer, and which uses oxygen as a positive electrode active material,
wherein the laminate is formed by laminating carbon black secondary particles and consists of carbon black primary particles and graphene on the gas diffusion layer,
wherein pores in the positive electrode have a pore size range of exceeding 100 nm formed between the carbon black secondary particles, and
wherein the carbon black secondary particles comprise 7.4 to 44.4 wt % graphene;
a negative electrode disposed to face the positive electrode; and
a separator disposed between the positive electrode and the negative electrode,
wherein the carbon black secondary particles are spherical and have a diameter greater than 500 nm to 10 μm or less.

2. The lithium air battery according to claim 1, wherein the carbon black primary particles are spherical and have a diameter of 1 nm to 500 nm, and
the graphene has plate-shaped in the size of 0.1 μm to 500 μm and in the thickness of 0.34 nm to 20 nm.

3. The lithium air battery according to claim 2, wherein the carbon black secondary particles have structure that the plate-shaped graphene is surrounded by the spherical carbon black primary particles, and
on a surface of the carbon black secondary particles, an area occupied by the spherical carbon black primary particles is larger than that occupied by the plate-shaped graphene.

4. The lithium air battery according to claim 1, wherein the carbon black secondary particles are prepared by dispersing the carbon black primary particles and the graphene in a solvent and then spray-drying them.

5. The lithium air battery according to claim 1, wherein the carbon black secondary particles include the pores having a pore size range of 20 to 100 nm formed between the carbon black primary particles and the graphene, the pores having a pore size range of less than 10 nm formed inside the carbon black primary particles, and the pores having a pore size range of less than 10 nm formed inside the graphene.

6. The lithium air battery according to claim 1, wherein the carbon black is one selected from the group consisting of ketjen black, super p, denka black, acetylene black, furnace black, and mixtures thereof.

7. The lithium air battery according to claim 1, wherein the graphene is one selected from the group consisting of graphene plate (GNP), graphene oxide (GO), reduced graphene oxide (rGO), and mixtures thereof.

8. The lithium air battery according to claim 1, wherein the positive electrode has an average pore size measured by mercury porosimetry is exceeding 100 nm to 10 μm or less.

9. The lithium air battery according to claim 1, wherein the gas diffusion layer comprises one active material selected from the group consisting of carbon cloth, carbon paper, carbon felt, an oxygen-selective permeable membrane, and mixtures thereof.

10. The lithium air battery according to claim 1, wherein the separator comprises one selected from the group consisting of polyethylene membrane, polypropylene membrane and glass fiber membrane.

11. The lithium air battery according to claim 1, wherein the lithium air battery further comprises one electrolyte selected from the group consisting of aqueous electrolyte, non-aqueous electrolyte, organic solid electrolyte, inorganic solid electrolyte, and mixtures thereof.

12. A method of manufacturing a lithium air battery according to claim 1, which comprises the steps of
dispersing the carbon black primary particles in a solvent to prepare a first dispersion;
dispersing the graphene in a solvent to prepare a second dispersion;
mixing the first dispersion and the second dispersion to prepare a slurry;
spray-drying the slurry to prepare the carbon black secondary particles; and
laminating the carbon black secondary particles on the gas diffusion layer to prepare the positive electrode.

13. The method of manufacturing a lithium air battery according to claim 12, wherein the step of spray-drying the slurry is carried out by spraying the slurry through a nozzle to form droplets in the size range of 10 to 500 μm and by removing the solvent of the droplets.

14. The method of manufacturing a lithium air battery according to claim 12, wherein the carbon black secondary particles are applied to the gas diffusion layer in the amount of 0.1 to 10 mg/cm$^2$.

* * * * *